Patented July 30, 1935

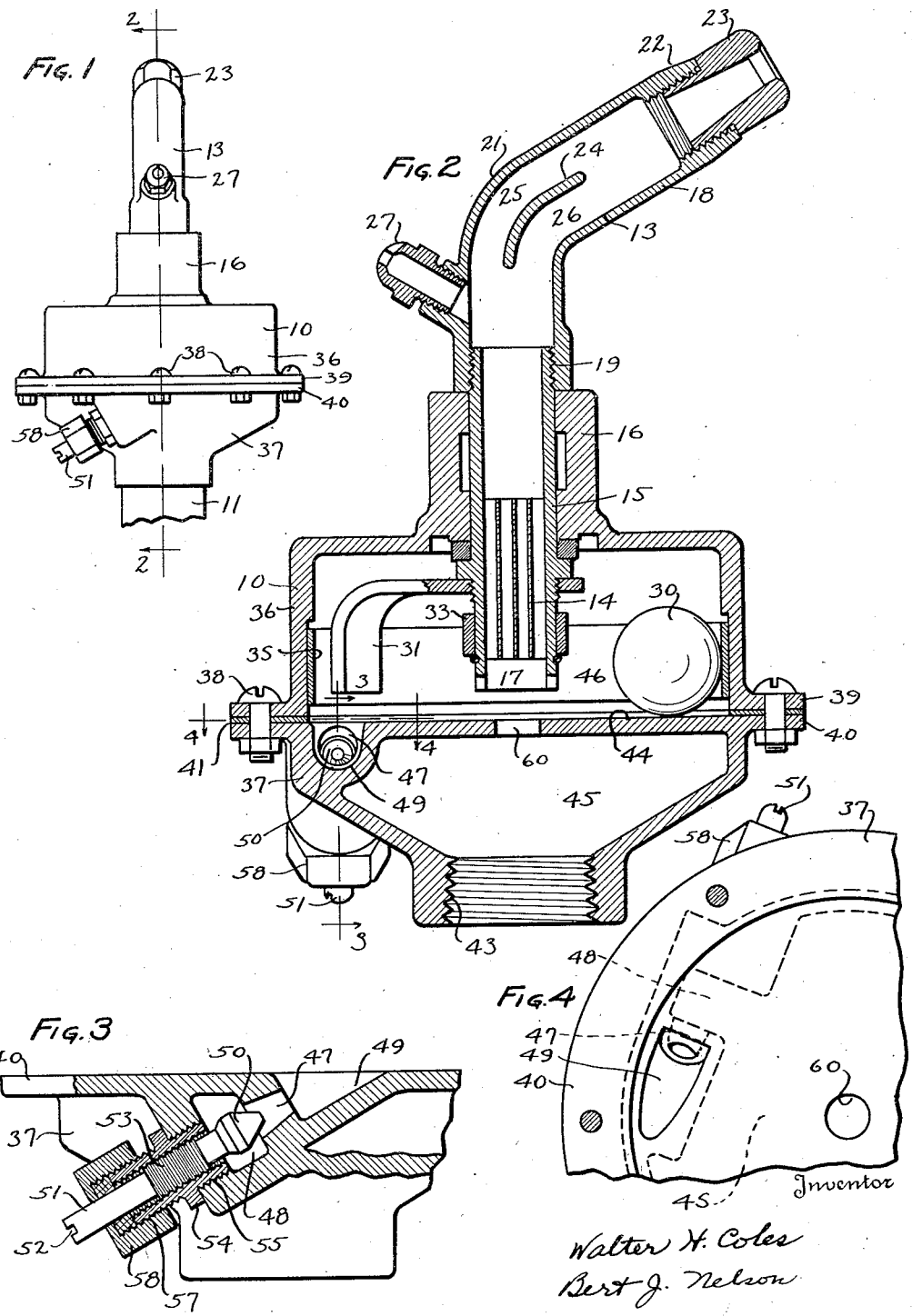

2,009,478

UNITED STATES PATENT OFFICE 2,009,478

IRRIGATION DEVICE

Walter H. Coles and Bert J. Nelson, Troy, Ohio, assignors to The Skinner Irrigation Company, Troy, Ohio, a corporation of Ohio Application May 21, 1932, Serial No. 612,772

4 Claims. (Cl. 299—67)

This invention relates to water sprinklers adapted for sprinkling or irrigating the ground.

One object of the invention is the provision of a sprinkler constructed and arranged so as to reduce the turbulence of the stream supplied to and through the sprinkling pipe so that an unusually large throw of water is obtained.

Another object of the invention is the provision of a sprinkling member which is moved slowly by impact means within the sprinkling housing and actuated by rotational movements of the water in the housing, the sprinkler having control means readily accessible from the exterior of the sprinkler so that the speed of the rotational movements of the water in the housing can be readily controlled in order that the speed of movement of the sprinkling member may be adjusted as desired.

Another object of the invention is the provision of a sprinkling device having a sprinkling member which is slowly rotated by means under the control of a rotating body of water in the sprinkler, there being a tangentially directed water inlet in the sprinkler body for causing the rotational whirl of the water and also an axially directed inlet for supplying water to the sprinkler body so that some of the water can move directly to the sprinkling member in order that substantially the full effect of the water pressure may be utilized.

Another object is the provision of a sprinkling pipe having a bent portion, through which the water is supplied to the sprinkling nozzle, the sprinkling pipe having a curved vane or wall provided within its bend and so arranged as to produce a smooth and direct flow of water through the pipe.

Other objects and advantages of the invention will be apparent from the following description, the appended claims and the accompanying drawing, in which—

Fig. 1 is a side elevation of a sprinkler embodying the present invention;

Fig. 2 is a vertical section on the line 2—2 of Fig. 1;

Fig. 3 is a section on the line 3—3 of Figure 2; and

Fig. 4 is a fragmentary sectional view on the line 4—4 of Fig. 2.

Referring more particularly to the drawing by reference numerals, similar numerals designating like parts in the various views, 10 designates generally the housing of a sprinkler, the housing being shown in Fig. 1 as mounted on a vertical water distributing pipe 11 by means of which the water is supplied to the interior of the housing. The water flows from the housing to the rotatable sprinkling member designated generally by the numeral 13. The sprinkling member 13 as herein shown embodies a depending stem portion 15 which is rotatably mounted for movement about an axis that is preferably vertical, the stem portion 15 being guided and supported in a bearing wall 16 of the housing 10. The lower end of the stem portion 15 is preferably provided with flow straightening means 14, and is directed axially into the housing, being open at 17 so that the water can flow into it from the interior of the housing. The water passes up through the stem portion 15 to the sprinkling pipe 18 which is connected, as shown, by means of the threads 19 to the threaded upper end of the portion 15. The sprinkling pipe 18 is bent at a substantial angle at the point 21 so that the nozzle receiving end 22 extends out laterally at an angle. A nozzle 23 having an opening of a desired size is threaded in the end 22 of the sprinkling pipe. The nozzle 23 is readily removable and may be unscrewed from the sprinkling pipe and replaced by another having a smaller or larger opening so that a smaller or a thicker stream of water can be readily provided for.

The movement of the water as it flows past the bent portion 21 of the sprinkling pipe is straightened and controlled by a partition vane or wall 24 which is curved in conformity with the curvature of the walls of the sprinkling pipe at the bend 21 so as to provide two channels 25 and 26 on opposite sides of the vane 24. Where two such vanes are used they are provided side by side. The turbulent action of the water that would otherwise be caused by a bend of comparatively small radius in the sprinkling pipe is thus avoided, and water is caused to flow directly and without substantial turbulent action into and through the entire sprinkling pipe so that the full force of the water is effective in giving a large throw or travel of the water from the nozzle.

An auxiliary nozzle 27 is preferably provided on the vertical portion of the sprinkling pipe as shown in Fig. 2, the auxiliary nozzle being directed oppositely to the direction of flow of water from the nozzle 23 and being of smaller size so as to cover a circle of smaller diameter than that covered by the comparatively large stream thrown from the nozzle 23.

Rotational movements of the sprinkling member are preferably imparted by means of an impact device which gives step by step movements to the sprinkling member, causing its slow rotation about a vertical axis. The impact device is shown in the form of a ball 30 which is freely movable within the housing 10 and which is adapted to be rotated by rotational movements of the water in the housing so as to strike against an arm 31 which is fixed to the stem portion of the sprinkling member. Each time the ball comes opposite the arm 31 it causes a slight movement of this arm and thus a slight movement of the sprinkling member. The ball then travels on past as it is carried along by the water in the housing. The main portion of the housing 10 is preferably made of brass or the like, while steel rings 33 and 35 may be provided on the stem portion of the sprinkling member and on the cylindrical wall of the housing respectively, to protect these parts from being worn by the heavy steel ball 30.

The housing 10 comprises a top housing section 36 and a bottom housing section 37, the two sections being secured together by bolts or screws 38 which extend through flanges 39 and 40 provided on the two housing sections. A rubber or leather gasket ring 41 is provided between the flanges. The lower housing section 37 has a threaded passage 43 by means of which it is secured to a water supply pipe. At the top of the lower housing section 37 is a flat wall 44 on which the ball 30 moves. Below the wall 44 is a water chamber 45 which receives the water from the pipe 11, part of the water thus received being passed into the upper water chamber 46 above the wall 44 through a tangentially directed opening or passage 47. The water chamber 45 is in free communication with a pocket 48 with which one end of the passage 47 communicates, the water being directed at rather high velocities through the conically tapered passage 47 in an upward and tangential direction and through the depression 49 provided in the plate 44. This causes a continuous rotational or whirling movement of the water in the water chamber 46 of the housing. The amount of flow through the passage 47 may be readily controlled from outside the housing by an adjusting mechanism as shown in Fig. 3. The conical passage 47 cooperates with a valve 50, preferably conically formed and rigid with an adjusting stem 51 which may be readily turned when a screw driver is engaged with the slot 52. The stem portion of the valve is threaded as indicated at 53 in a nut 54 which is threaded at 55 in the wall of the lower housing section 37. The nut 55 is provided with external threads 57 by means of which a packing nut 58 is held in place. It will be apparent that the stem of the valve when turned moves the valve 50 a desired distance from the end of the passage 47 and thus regulates the flow of water through this passage into the water chamber 46.

Some of the water supplied to the lower housing section is supplied directly and axially into the water chamber 46 through a passage 60 preferably centrally arranged in the wall 44 and so arranged as to direct the water flow through it toward the inlet of the stem portion of the sprinkling member. Thus some water is supplied axially and directly to and through the water chamber 46, while the remaining portion is directed tangentially into the water chamber through the passage 47, the amounts of water supplied through these passages being relatively controlled by the operator so that the desired speed of rotation of the water in the housing can be readily obtained. Thus if the pressure of the water supplied to the sprinkling member is rather high, the greater part of the water supplied to the sprinkling member can flow through axially through the water chamber 46, having no rotational effect on the water in that chamber, while a comparatively smaller portion of the water flows through the passage 47 and causes the ball 30 to be rotated at a desired speed. If the opening in the nozzle 23 is quite small, or if the pressure of the water supplied to the sprinkler is not very great, the throttled passage 47 can be fully opened so that sufficient water can flow through this passage to cause the desired speed of movement of the sprinkling member. It will be observed that where the amount of water flowing through the nozzle is large and a large throw of water is desired, the larger portion of the water supplied to the sprinkling member travels quite directly through a short direct path from the supply pipe 11 so that the energy of the water is not used up in the creation of useless and unnecessary whirls and turbulent movements. The curved vane 24 in the bent portion of the sprinkling pipe cooperates with the construction providing for direct flow of water to the sprinkling member, both actions substantially reducing the useless turbulent and agitated movements of the water in its entire passage through the sprinkler. As the flow through the tangentially directed passage 47 can be so controlled as to give a slow rotational step by step movement of the sprinkling member and as the turbulent and useless eddying action of the water is reduced to a minimum it will be apparent that an unusually large throw of a rather heavy stream of water can be obtained.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a sprinkler of the character described, a water housing, a sprinkling member rotatably mounted thereon, said sprinkling member having an inlet opening in direct communication with the water housing, water operated means rotatable within said housing and adapted for impact engagement with said sprinkling member for imparting rotational step by step movements thereto, water supply means for supplying water into said housing and arranged to cause rotational movement of the water within the housing, said housing having additional water supply means for supplying water into said housing substantially axially thereof, and mechanism freely accessible at a side of said housing for adjusting said first water supply means to control the rotational speed of the water in the housing.

2. In a sprinkler of the character described, a water housing, a sprinkling member rotatably mounted thereon, said sprinkling member having an inlet opening in direct communication with the water housing, water operated means rotatable within said housing for imparting step by step rotational movement to said sprinkling member, said water housing having a tangentially directed inlet opening for causing rotational movements of water in the housing, said housing also having an axially directed opening for supplying water in an axial direction to the rotating water in said housing and in a direction toward the inlet opening of the sprinkling member, and means accessible from the exterior of the housing while mounted for sprinkling for controlling the flow through said tangentially directed opening.

3. In a sprinkler of the character described, a water housing, a sprinkling member rotatably mounted thereon, said sprinkling member having an inlet opening in communication with said water housing for the supply of water from said housing directly to said sprinkling member, water operated means rotatable within said housing for imparting slow rotational movement to said sprinkling member, said water housing having a plurality of water inlets, one of which is directed tangentially to impart rotational movements to the water in the housing and another of which is directed axially with respect to the said rotational movement of the water in the housing, and means accessible from the exterior of the sprinkler while mounted for sprinkling and adapted for manual adjustment for controlling the size of one of said inlets to control the speed of rotation of the sprinkling member.

4. A sprinkler comprising a water housing providing a water chamber, a sprinkling member receiving its water supply from the water chamber and forming the sole outlet for water from said chamber, a plurality of water supply passages for supplying water to said chamber, only one of said passages directing the water tangentially into said chamber for rotating the water therein about an axis substantially corresponding to the axis of rotation of the sprinkling member, the other said passage forming an unobstructed path in alignment with said axis of rotation of the water, means operated by the rotation of the water in said chamber for rotating said sprinkling member and means accessible from the exterior of the sprinkler while mounted for sprinkling for adjusting the rate of flow through said tangentially directed passage for control of the rotational speed of water in the housing.

WALTER H. COLES.
BERT J. NELSON.